United States Patent
Othmer

(10) Patent No.: US 12,391,098 B2
(45) Date of Patent: Aug. 19, 2025

(54) VENTILATION DEVICE FOR A MOTOR VEHICLE

(71) Applicant: Volkswagen Aktiengesellschaft, Wolfsburg (DE)

(72) Inventor: Carsten Othmer, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 822 days.

(21) Appl. No.: 16/977,363

(22) PCT Filed: Feb. 19, 2019

(86) PCT No.: PCT/EP2019/054050
§ 371 (c)(1),
(2) Date: Sep. 1, 2020

(87) PCT Pub. No.: WO2019/166274
PCT Pub. Date: Sep. 6, 2019

(65) Prior Publication Data
US 2021/0107337 A1    Apr. 15, 2021

(30) Foreign Application Priority Data

Mar. 1, 2018 (DE) ...................... 10 2018 203 076.6

(51) Int. Cl.
*B60H 1/34* (2006.01)
*B60H 1/00* (2006.01)
(Continued)

(52) U.S. Cl.
CPC ....... *B60H 1/3414* (2013.01); *B60H 1/00564* (2013.01); *F24F 13/062* (2013.01);
(Continued)

(58) Field of Classification Search
CPC .. F24F 13/06; F24F 2013/0616; F24F 13/062; F24F 13/14; F24F 2221/28;
(Continued)

(56) References Cited

U.S. PATENT DOCUMENTS 5,462,483 A * 10/1995 Loup .................. B60H 1/00678
454/160
5,762,395 A * 6/1998 Merrifield .......... B60H 1/00028
180/90
(Continued)

FOREIGN PATENT DOCUMENTS

| CN | 105189162 A | 12/2015 |
| CN | 105564199 A | 5/2016 |

(Continued)

OTHER PUBLICATIONS

Chinese Office Action dated Feb. 10, 2023 in corresponding application 201980016358.4.
(Continued)

*Primary Examiner* — Allen R. B. Schult
*Assistant Examiner* — William C Weinert
(74) *Attorney, Agent, or Firm* — Muncy, Geissler, Olds & Lowe, P.C.

(57) ABSTRACT

A ventilation device for a motor vehicle, having a first ventilation duct for the throughflow of a first air flow, a second ventilation duct which is separate from the first ventilation duct for the throughflow of a second air flow and an air outlet which is coupled in a fluid-communicating manner to a first duct end of the first ventilation duct and to a second duct end of the second ventilation duct, for releasing an overall air flow into a passenger compartment of the motor vehicle. A first air flow strength of the first air flow and a second air flow strength of the second air flow can be set individually. The air outlet has a first deflecting wall (Continued)

in the direction of flow downstream of the first duct end that is designed for deflecting the first air flow such that the first air flow intersects the second air flow.

6 Claims, 4 Drawing Sheets

(51) Int. Cl.
*F24F 13/062* (2006.01)
*F24F 13/14* (2006.01)

(52) U.S. Cl.
CPC ...... *F24F 13/14* (2013.01); *B60H 2001/3471* (2013.01); *F24F 2221/28* (2013.01)

(58) Field of Classification Search
CPC ...... B60H 1/34; B60H 1/3421; B60H 1/3414; B60H 1/00564; B60H 2001/3471; B60H 1/00871; B60H 1/3407
USPC ......................................... 454/152, 155, 139
See application file for complete search history.

(56) References Cited

U.S. PATENT DOCUMENTS

| | | | | |
|---|---|---|---|---|
| 7,527,329 | B2* | 5/2009 | Alacqua | ............... B60N 2/5657 |
| | | | | 297/180.13 |
| 10,065,475 | B2* | 9/2018 | Humburg | ........... B60H 1/00457 |
| 10,099,536 | B2 | 10/2018 | Albin et al. | |
| 10,352,580 | B2 | 7/2019 | Kim et al. | |
| 10,500,926 | B2 | 12/2019 | Freese et al. | |
| 10,682,899 | B2 | 6/2020 | Uhlenbusch et al. | |
| 11,035,583 | B2 | 6/2021 | Kim et al. | |
| 2016/0039389 | A1 | 2/2016 | Kato et al. | |
| 2016/0101668 | A1* | 4/2016 | Doll | ....................... F24F 13/072 |
| | | | | 454/155 |
| 2016/0121697 | A1 | 5/2016 | Yamamoto et al. | |
| 2016/0236541 | A1* | 8/2016 | Gruenbeck | .......... B60H 1/3414 |

FOREIGN PATENT DOCUMENTS

| | | | | |
|---|---|---|---|---|
| CN | 106560659 A | | 4/2017 | |
| DE | 10202926 A1 | | 7/2003 | |
| DE | 102015120290 A1 | | 6/2016 | |
| DE | 102015116242 B3 | | 9/2016 | |
| DE | 102015109069 A1 | | 12/2016 | |
| DE | 102017113906 A1 | | 8/2017 | |
| DE | 102016119547 A1 | | 9/2017 | |
| JP | S55105141 A | | 8/1980 | |
| JP | S62228833 A | * | 12/1985 | ............. B60H 1/34 |
| JP | H0198011 U | | 6/1989 | |

OTHER PUBLICATIONS

International Search Report dated Jul. 8, 2019 in corresponding application PCT/EP2019/054050.

* cited by examiner

VENTILATION DEVICE FOR A MOTOR VEHICLE

This nonprovisional application is a National Stage of International Application No. PCT/EP2019/054050, which was filed on Feb. 19, 2019, and which claims priority to German Patent Application No. 10 2018 203 076.6, which was filed in Germany on Mar. 1, 2018, and which are both herein incorporated by reference.

BACKGROUND OF THE INVENTION

Field of the Invention

The present invention relates to a louverless ventilation device for a motor vehicle by means of which an air flow can be caused to flow into a passenger compartment of the motor vehicle in a targeted and directed manner. In addition, the present invention relates to a motor vehicle that has a ventilation device according to the invention.

Description of the Background Art

Many different ventilation devices are known for ventilating motor vehicles. Ventilation devices with adjustable louvers for targeted deflection of the air flow are especially common. Such ventilation devices usually have a ventilation duct with a duct end and with an air outlet with a multiplicity of adjustable louvers that is arranged at the duct end. The adjustable louvers oftentimes are oriented vertically in one section and horizontally in another section so as to be able to divert the air flow in many different directions. Other known ventilation devices have a pivotable air outlet with louvers that are fixed or even additionally pivotable. The air outlet is at least partially spherical in design to prevent lateral outflow of the air past the air outlet and to be able to divert the air flow in many different directions. In other ventilation devices, the air outlet is designed in the manner of a pivotable nozzle by means of which the air flow is focused and likewise can be diverted in several different directions.

A ventilation device for a motor vehicle is known from DE 102 02 926 A1 that has an air duct as well as an air outlet, wherein the air duct is coupled in fluid communication to the air outlet. Arranged inside the air outlet are multiple louvers that can pivot about different pivot axes to divert a primary air flow flowing through the air duct. In order to pivot the louvers, the ventilation device has a lever that is mechanically coupled to the louvers and that projects out of the air outlet. DE 10 2015 120 290 A1, which corresponds to U.S. Pat. No. 10,099,536, discloses a ventilation device for a motor vehicle with an air duct as well as an air outlet, wherein the air duct is coupled in fluid communication to the air outlet. Arranged inside the air outlet is a louver that can pivot about a horizontal axis. Pivoting the louver makes it possible to divert a primary air flow flowing through the air duct.

DE 10 2015 116 242 B3 shows a ventilation device for a motor vehicle that has a primary ventilation duct as well as two secondary ventilation ducts, all of which are coupled in fluid communication to a common air duct. In the region ahead of the air outlet, the primary ventilation duct is designed in the manner of a de Laval nozzle. An air flow portion of the secondary ducts can be influenced by means of a valve device. Air discharge openings of the secondary ducts are directed at one another and at the primary ventilation duct so that a targeted deflection of the primary air flow can be achieved by applying a secondary air flow to a secondary duct.

Ventilation devices with adjustable louvers that are accessible from the outside have the disadvantage that movable parts are located in the area of the passenger compartment, and these movable parts can be unintentionally adjusted through carelessness on the part of an occupant of the motor vehicle. Furthermore, adjustable louvers can only be manufactured and installed in a resource-intensive manner, and have a certain amount of wear. Ventilation devices with multiple secondary ducts whose air discharge openings are directed at one another have the disadvantage that they can have high noise generation, and therefore can decrease the ride comfort of the motor vehicle significantly.

SUMMARY OF THE INVENTION

It is therefore an object of the present invention to overcome the above-described disadvantages in a ventilation device for a motor vehicle and in a motor vehicle having a ventilation device. In particular, it is an object of the invention to create a ventilation device for a motor vehicle and a motor vehicle having a ventilation device that ensure provision of a directed air flow in a passenger compartment of the motor vehicle in a simple and economical manner and preferably avoid excessive noise generation in doing so.

The above object is attained by a ventilation device according to an exemplary embodiment, and by a motor vehicle according to an exemplary embodiment. Features and details that are described in connection with the ventilation device according to the invention also apply in connection with the motor vehicle according to the invention and vice versa, so mutual reference is or can always be made with regard to the disclosure of the individual aspects of the invention.

According to a first aspect of the invention, the object is attained by a ventilation device for a motor vehicle. The ventilation device has a first ventilation duct for the throughflow of a first air flow, a second ventilation duct that is separate from the first ventilation duct for the throughflow of a second air flow, and an air outlet coupled in fluid communication to a first duct end of the first ventilation duct and to a second duct end of the second ventilation duct for discharging an overall air flow into a passenger compartment of the motor vehicle. The overall air flow includes the first air flow and the second air flow. A first air flow intensity of the first air flow and a second air flow intensity of the second air flow can be set individually. According to the invention, the air outlet has a first deflecting wall downstream of the first duct end in the direction of flow, wherein the first deflecting wall is designed to deflect the first air flow in such a manner that the first air flow intersects the second air flow.

The first ventilation duct and the second ventilation duct are preferably designed as ventilation ducts with a nonadjustable cross-section in each case. The first ventilation duct and the second ventilation duct are separated from one another, preferably in such a way that direct air exchange between the first ventilation duct and the second ventilation duct is not possible. Preferably, the first ventilation duct and the second ventilation duct are separated from one another by a common partition, wherein the partition preferably is designed as a fixed partition, which is to say not adjustable or pivotable. As an alternative to a partition, a third ventilation duct can also be arranged between the first ventilation duct and the second ventilation duct. In further preferred fashion, the first ventilation duct and the second ventilation duct are arranged parallel to one another, wherein the first duct end and the second duct end preferably likewise point in the same direction. Accordingly, the first ventilation duct and the second ventilation duct preferably are designed such that a first air flow exiting the first duct end flows parallel to a second air flow exiting the second duct end. The first ventilation duct and/or the second ventilation duct preferably have a round, semicircular, or similar duct cross-section. The partition is preferably designed to be plate-like or flat with an elongated extent in the direction of flow. Preferably, the ventilation device is designed such that the first ventilation duct is located above the second ventilation duct in the installed state.

The air outlet is arranged downstream of the first duct end and the second duct end in the direction of flow. The air outlet is designed to combine the first air flow and the second air flow into the overall air flow. For this purpose, according to the invention the air outlet has the first deflecting wall downstream of the first duct end in the direction of flow. The first deflecting wall is preferably arranged directly at the first duct end, and especially preferably is designed as a continuation of a first duct wall of the first ventilation duct. Especially preferably, the first deflecting wall is connected to the first duct wall in such a manner that a maximally laminar flow against the first deflecting wall is ensured. Consequently, the first deflecting wall is preferably designed to be rounded in the region of the connection to the first duct wall, and accordingly has a first rounding. This first rounding is preferably implemented toward the second air flow. Moreover, the air outlet is designed to direct the overall air flow, which includes the first air flow and the second air flow, into the passenger compartment of the motor vehicle. The air outlet preferably has no moving parts, as for example pivoting or rotatable vanes, flaps, louvers, nozzles, or the like.

The ventilation device is additionally designed to control the first air flow intensity of the first air flow and the second air flow intensity of the second air flow individually. This means that different second air flow intensities can be set when there is a predefined first air flow intensity. In like manner, different first air flow intensities can be set when there is a predefined second air flow intensity. Accordingly, the first air flow intensity and the second air flow intensity can be chosen essentially independently of one another within the limits of the technical performance of the ventilation device. For this purpose, provision can be made according to the invention that the ventilation device has a separate ventilating mechanism in each case to produce an air flow for the first ventilation duct and the second ventilation duct, which can be controlled separately from one another. Alternatively, the ventilation device can have a common ventilating mechanism to produce a primary air flow that can be divided between the first ventilation duct and the second ventilation duct.

A ventilation device according to the invention has the advantage over conventional ventilation devices that a directed overall air flow can be created in the passenger compartment of the motor vehicle with simple means and in an economical manner, wherein a direction and an intensity of the overall air flow can be controlled through a targeted control of the first air flow intensity and the second air flow intensity. When the first air flow intensity and the second air flow intensity are equal, the overall air flow is parallel to the first ventilation duct and the second ventilation duct. By changing the first air flow intensity relative to the second air flow intensity, the overall air flow can be deflected accordingly. If the first ventilation duct is located over the second ventilation duct, and the first air flow intensity is increased relative to the second air flow intensity, the overall air flow is deflected downward as a result. Additional vanes, flaps, louvers, nozzles, or the like are thus not necessary so that it is possible to save material and installation costs. Moreover, unintentional adjustment of the flow direction of the overall air flow can thus be avoided easily. A further advantage of the ventilation device is that the development of noise on account of air flow noises is minor because of the diversion of the first air flow downstream of the first duct end.

The first deflecting wall can have a first curvature, wherein the first curvature is directed away from the second air flow in the direction of flow. The first curvature preferably adjoins a rounding of the first deflecting wall pointing toward the second air flow, so that the first deflecting wall initially goes toward the second air flow and subsequently turns away therefrom. The first curvature preferably has a first radius of curvature that is at least twice as large, especially preferably at least three times as large, as a first rounding radius of the first rounding is designed. In this way, a laminar flow of the overall air flow composed of first air flow and second air flow is improved with simple means. Moreover, development of noise on account of air flow noises can be reduced further because of the first curvature.

The air outlet can have a second deflecting wall downstream of the second duct end in the direction of flow, wherein the second deflecting wall is designed to deflect the second air flow toward the first air flow. The second deflecting wall preferably is arranged directly at the second duct end, and especially preferably is designed as a continuation of a second duct wall of the second ventilation duct. Especially preferably, the second deflecting wall is connected to the second duct wall in such a manner that a maximally laminar flow against the second deflecting wall is ensured. Consequently, the second deflecting wall is preferably designed to be rounded in the region of the connection to the second duct wall, and accordingly has a second rounding. This second rounding is preferably implemented toward the second air flow. Preferably, the second deflecting wall is designed to mirror image the first deflecting wall. A second deflecting wall has the advantage that a combining of the first air flow and the second air flow is improved. Moreover, a flow cross-section of the air outlet is further reduced by this means so that a targeted deflectability of the overall air flow with little development of noise on account of air flow noises is improved with simple means and economically.

The second deflecting wall can have a second curvature, wherein the second curvature is directed away from the first air flow in the direction of flow. The second curvature preferably adjoins a rounding of the second deflecting wall pointing toward the first air flow, so that the second deflecting wall initially goes toward the first air flow and subsequently turns away therefrom. The second curvature preferably has a second radius of curvature that is at least twice as large, especially preferably at least three times as large, as a second rounding radius of the second rounding is designed. Preferably, the air outlet has a cross-section in the manner of a de Laval nozzle on account of the first curvature and the second curvature. In this way, a laminar flow of the overall air flow composed of first air flow and second air flow is improved with simple means. Moreover, development of noise on account of air flow noises can be reduced further because of the second curvature.

The air outlet can have a suction device for drawing in the first air flow and/or the second air flow and/or has a blow-out device for creating a blow-out air flow that interacts with the first air flow and/or the second air flow. The suction device preferably is arranged downstream of a narrowest air outlet cross section of the air outlet in the direction of flow, and preferably is oriented toward a central axis of the air outlet. As a result, an efficient drawing in of the overall air flow is improved by means of a suction air flow. The blow-out device preferably is arranged downstream of the narrowest air outlet cross section of the air outlet in the direction of flow, and preferably is oriented toward the central axis of the air outlet. Alternatively, the blow-out device can also point away from the central axis, and thus deflect the overall air flow by means of the Coanda effect. In this way, efficient deflection of the overall air flow is improved by means of the blow-out air flow. A suction device and a blow-out device have the advantage that a targeted deflection of the overall air flow can be improved with simple means and economically.

The first ventilation duct can have a first duct inlet and the second ventilation duct has a second duct inlet, wherein the first duct inlet and the second duct inlet are coupled in fluid communication to a common primary ventilation duct in such a manner that a primary air flow flowing through the primary ventilation duct in the direction of flow can be directed into the first duct inlet and/or into the second duct inlet. The primary ventilation duct is preferably arranged to be parallel, or at least parallel in an end section, to the first ventilation duct or to the second ventilation duct. By means of the primary ventilation duct, it is possible to provide a primary air flow that can be divided between the first ventilation duct and the second ventilation duct. Through the targeted determination of a flow velocity of the primary air flow and of a division ratio of the primary air flow between the first ventilation duct and the second ventilation duct, targeted setting of the first air flow intensity and the second air flow intensity is therefore possible in an advantageous manner and with simple means.

The ventilation device can have an air flow control device, wherein the air flow control device is designed for targeted control of a division of the primary air flow flowing through the primary ventilation duct between the first ventilation duct and the second ventilation duct. The air flow control device is preferably designed to set an effective flow cross-section of the first ventilation duct and of the second ventilation duct in a targeted manner. For this purpose, provision can be made that the air flow control device has, for example, a first control valve and a second control valve, wherein the first control valve is designed to close and open the first ventilation duct, and the second control valve is designed to close and open the second ventilation duct. The first valve and the second valve can be implemented independently of one another or can be mechanically coupled to one another. An air flow control device has the advantage that a targeted division of the primary air flow between the first ventilation duct and the second ventilation duct is improved herewith.

Provision can also be made according to the invention that the air flow control device can have a movable flap for dividing the primary air flow between the first ventilation duct and the second ventilation duct. The movable flap is preferably arranged inside the primary ventilation duct adjacent to the first duct inlet and the second duct inlet. Preferably, a pivot axis of the flap is arranged at a partition separating the first ventilation duct and the second ventilation duct. A free end of the flap preferably projects into the primary ventilation duct opposite to the direction of flow. The flow cross sections of the first duct inlet and the second duct inlet can be changed by means of the flap and the primary air flow can be divided in a targeted manner between the first ventilation duct and the second ventilation duct. Preferably, the flap is designed such that it completely closes the first duct entrance in a first extreme position and completely closes the second duct entrance in a second extreme position. Provision can be made according to the invention that the flap has a full-perimeter seal, for example in an edge region, in order to improve a sealing of the first duct inlet and the second duct inlet. A flap has the advantage that a targeted division of the primary air flow between the first ventilation duct and the second ventilation duct is ensured with simple means and economically.

An air outlet cross section of the air outlet can have a narrowing as well as a widening in the direction of flow. Preferably, the air outlet cross section is designed in the manner of a de Laval nozzle. An efficient combining of the first and second air flows is improved by means of the narrowing. Due to the widening, a deflection of the overall air flow is improved and development of noise on account of air flow noises is reduced.

According to the second aspect of the invention, the object is attained by a motor vehicle with a passenger compartment and with a ventilation device for ventilating the passenger compartment. In accordance with the invention, the ventilation device is implemented as a ventilation device according to the invention. Moreover, the air outlet of the ventilation device opens into the passenger compartment. The air outlet here preferably is arranged relative to the passenger compartment such that the overall air flow is directed in a neutral direction when the first air flow intensity and second air flow intensity are equal, wherein this neutral direction is located in a center between a maximum upper intended overall direction of flow and a maximum lower overall direction of flow.

All the advantages that have already been described in reference to a ventilation device according to the first aspect of the invention arise in the motor vehicle described. Accordingly, the motor vehicle according to the invention has the advantage over conventional motor vehicles that a directed overall air flow can be created in the passenger compartment of the motor vehicle with simple means and in an economical manner, wherein a direction and an intensity of the overall air flow can be controlled through a targeted control of the first air flow intensity and the second air flow intensity. When the first air flow intensity and the second air flow intensity are equal, the overall air flow is parallel to the first ventilation duct and the second ventilation duct. By changing the first air flow intensity relative to the second air flow intensity, the overall air flow can be deflected accordingly. If the first ventilation duct is located over the second ventilation duct, and the first air flow intensity is increased relative to the second air flow intensity, the overall air flow is deflected downward as a result. Additional vanes, flaps, louvers, nozzles, or the like are thus not necessary so that it is possible to save material and installation costs. Moreover, unintentional adjustment of the flow direction of the overall air flow can thus be avoided easily. A further advantage of the motor vehicle according to the invention is that the development of noise of the ventilation device on account of air flow noises is minor because of the diversion of the first air flow downstream of the first duct end.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
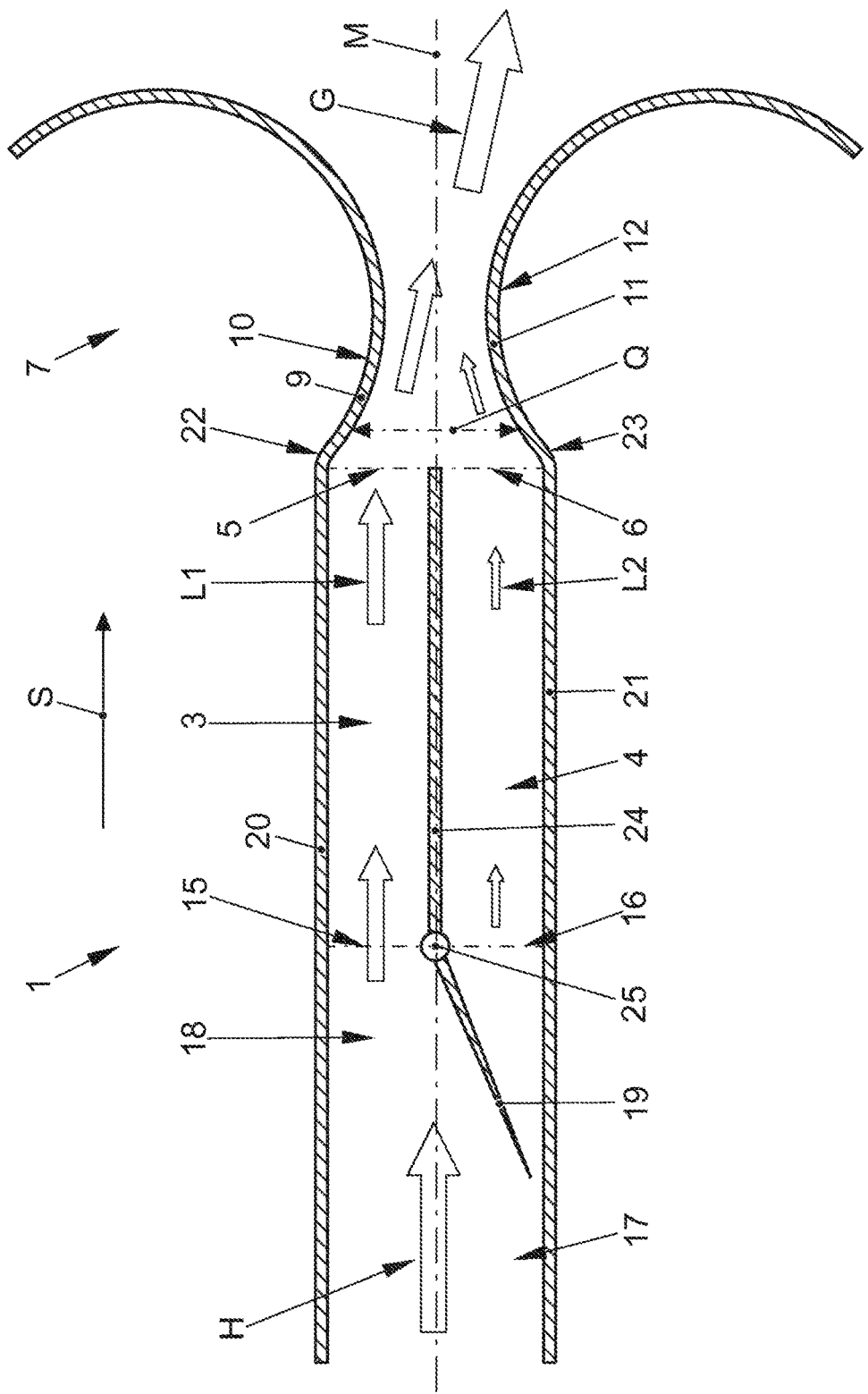
FIG. 1 shows an exemplary embodiment of a ventilation device according to the invention in a sectional representation.

In FIG. 1, a ventilation device 1 according to the invention for a motor vehicle 2 (see FIG. 4) is shown schematically in a sectional representation. The ventilation device 1 has a first ventilation duct 3 with a first duct inlet 15 and a first duct end 5, and has a second ventilation duct 4 with a second duct inlet 16 and a second duct end 6. The first ventilation duct 3 and the second ventilation duct 4 are separated from one another in a fluid-tight manner by a partition 24. The first ventilation duct 3 is bounded in a fluid-tight manner in the radial direction by a first duct wall 20 and the second ventilation duct 4 is bounded in a fluid-tight manner by a second duct wall 21. In the direction of flow S, a primary ventilation duct 17 is formed upstream of the first duct inlet 15 and of the second duct inlet 16. The primary ventilation duct 17 is bounded in a fluid-tight manner in the radial direction by the first duct wall 20 and the second duct wall 21. Arranged at the level of the first duct inlet 15 and of the second duct inlet 16 in the direction of flow S is an air flow control device 18 for the targeted division of a primary air flow H flowing through the primary ventilation duct 17 between the first ventilation duct 3 and the second ventilation duct 4. The air flow control device 18 has a pivoting device 25 and a flap 19 supported on the pivoting device 25. The pivoting device 25 is arranged on the partition 24. The flap 19 projects into the primary ventilation duct 17. By pivoting the flap 19 about the pivoting device 25, the primary air flow H can be divided into a first air flow L1 flowing through the first ventilation duct 3 and a second air flow L2 flowing through the second ventilation duct 4. In this depiction, an end of the flap 12 that is distal to the pivoting device 25 is facing the second duct wall 21 so that a larger portion of the primary air flow H flows into the first ventilation duct 3 and a smaller portion of the primary air flow H flows into the second ventilation duct 4.

Located at the first duct end 5 and the second duct end 6 is an air outlet 7 of the ventilation device 1. The air outlet 7 has a first deflecting wall 9, which is connected to the first duct wall 20. Immediately adjacent to the first duct wall 20, the first deflecting wall 9 has a first rounding 22, which is curved toward the second air flow L2. The first rounding 22 is followed in the direction of flow S by a first curvature 10 of the first deflecting wall 9, which is curved away from the second air flow L2. The first deflecting wall 9 is thus designed to deflect the first air flow L1 toward the second air flow L2. In addition, the air outlet 7 has a second deflecting wall 11, which is connected to the second duct wall 21. Immediately adjacent to the second duct wall 21, the second deflecting wall 11 has a second rounding 23, which is curved toward the first air flow L1. The second rounding 23 is followed in the direction of flow S by a second curvature 12 of the second deflecting wall 11, which is curved away from the first air flow L1. The second deflecting wall 11 is thus designed to deflect the second air flow L2 toward the first air flow L1. In this exemplary embodiment, the air outlet 7 is designed with mirror-image symmetry about a central axis M. An air outlet cross section Q of the air outlet 7 tapers in the direction of flow S from the first duct end 5 and second duct end 6 to a minimum and then widens again. As a result, the air outlet 7 is designed approximately in the manner of a de Laval nozzle. In the air outlet 7, the first air flow L1 and the second air flow L2 are combined into an overall air flow G.

In FIG. 1, the first air flow L1 is greater than the second air flow L2 on account of the position of the flap 19. Because the first air flow L1 is deflected downward by the first deflecting wall 9 in this depiction and is caused to be more intense than the second air flow L2, the overall air flow G exiting the air outlet 7 likewise flows downward. A further motion of the flap 19 toward the second duct wall 21 would further increase a proportion of the primary air flow H flowing into the first air duct 3, and therefore reduce a proportion of the primary air flow H flowing into the second ventilation duct 4 correspondingly, and bring about a stronger deflection of the overall air flow G downward. In like manner, a motion of the flap 19 toward the first duct wall 20 would reduce a proportion of the primary air flow H flowing into the first air duct 3, and therefore increase a proportion of the primary air flow H flowing into the second ventilation duct 4 correspondingly, and bring about a stronger deflection of the overall air flow G further upward.

Figure 2:
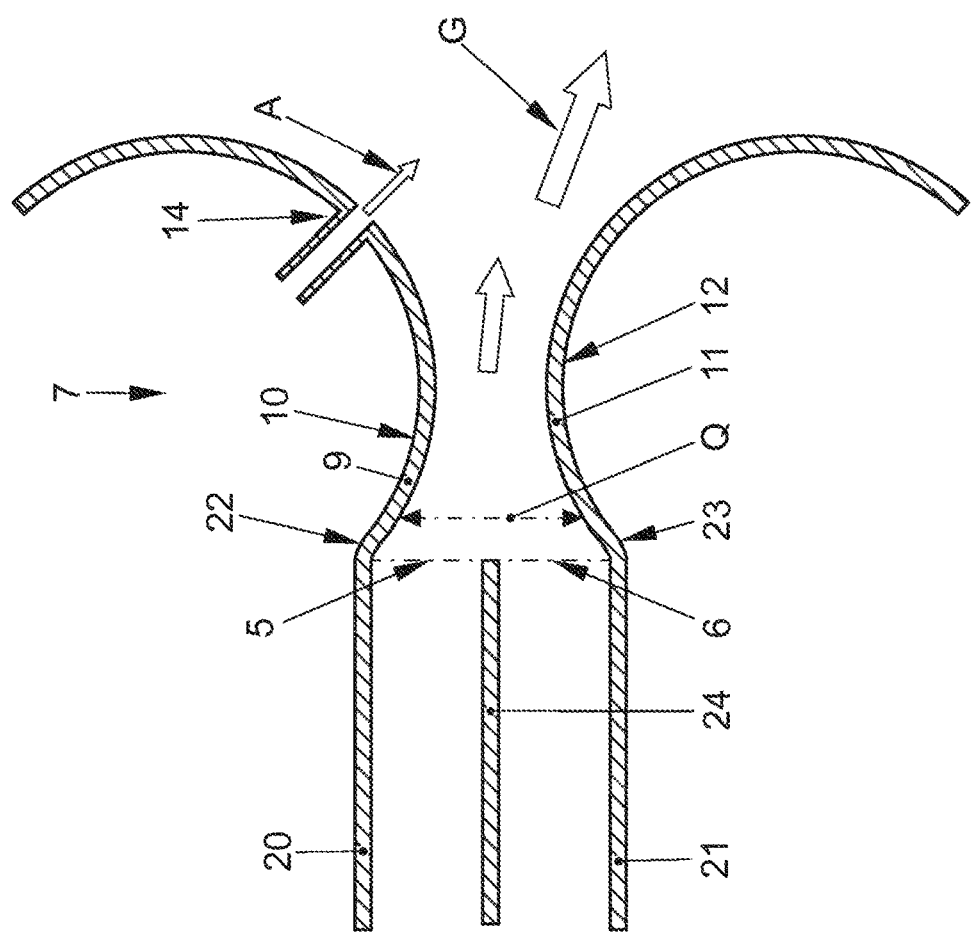
FIG. 2 shows an outlet region of a ventilation device according to an exemplary embodiment of the invention in a sectional representation.

In FIG. 2, an outlet region of a ventilation device 1 according to the invention is shown schematically in a sectional representation. In this second embodiment of the ventilation device 1 according to the invention, a blow-out device 14 for blowing out a blow-out air flow A is arranged in an upper region of the air outlet 7 downstream of the narrowest air outlet cross section Q. The blow-out device 14 is designed to blow the blow-out air flow A out in the direction of the overall air flow G—or in the direction of the first air flow L1/second air flow L2. Blowing out the blow-out air flow A causes the overall air flow G to be deflected further.

Figure 3:
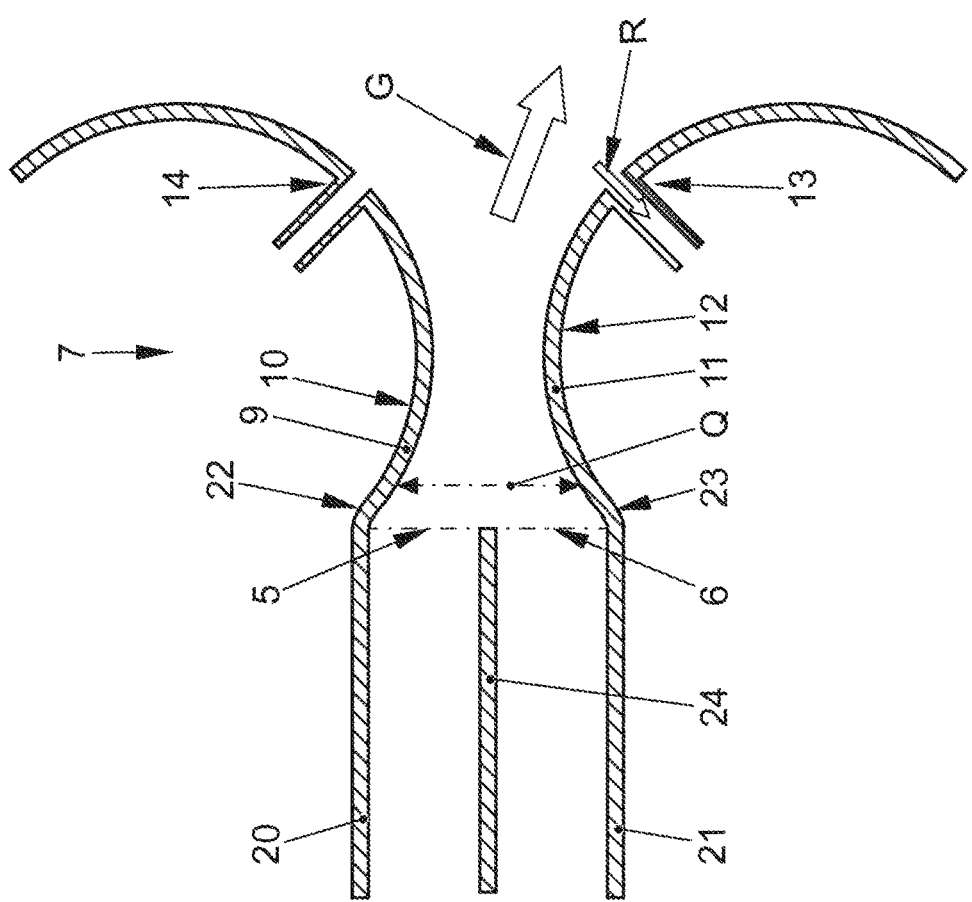
FIG. 3 shows an outlet region of an exemplary embodiment of a ventilation device according to the invention in a sectional representation.

In FIG. 3, an outlet region of a ventilation device 1 according to the invention is shown schematically in a sectional representation. In this third embodiment of the ventilation device 1 according to the invention, a suction device 13 for drawing in the overall air flow G by means of a suction air flow R is arranged in a lower region of the air outlet 7 downstream of the narrowest air outlet cross section Q. In addition, a blow-out device 14 for blowing out a blow-out air flow A is likewise arranged in an upper region of the air outlet 7 downstream of the narrowest air outlet cross section Q. According to the invention, virtually any desired suction devices 13 and blow-out devices 14 can be arranged at the air outlet 7. Furthermore, a deflector can be provided, which is implemented as both a suction device 13 and a blow-out device 14. A preferred position of such a deflector corresponds to a position of the suction device 13 or blow-out device 14 that are shown.

Figure 4:
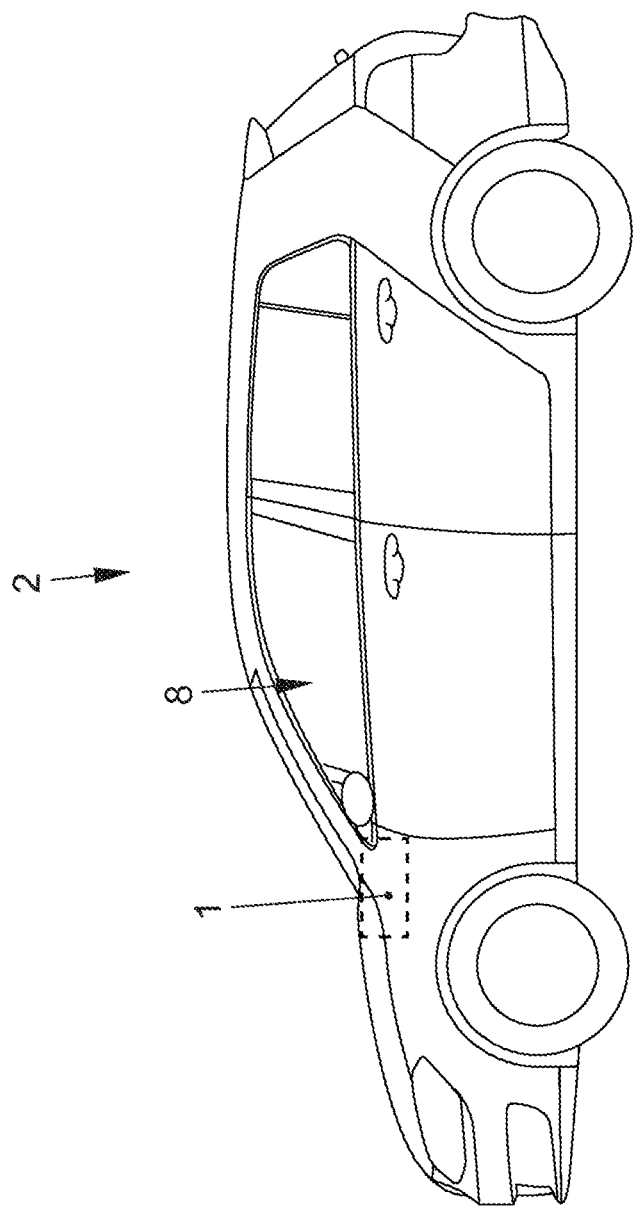
FIG. 4 shows an exemplary embodiment of a motor vehicle according to the invention in a side view.

FIG. 4 schematically shows a preferred embodiment of a motor vehicle 2 according to the invention in a side view. The motor vehicle 2 has a passenger compartment 8 and a ventilation device 1 according to the invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A ventilation device for a motor vehicle, comprising:
a first ventilation duct for the throughflow of a first air flow,
a second ventilation duct that is separate from the first ventilation duct for the throughflow of a second air flow, and
an air outlet that is coupled in fluid communication to a first duct end of the first ventilation duct and to a second duct end of the second ventilation duct for discharging an overall air flow into a passenger compartment of the motor vehicle,
wherein the overall air flow includes the first air flow and the second air flow,
wherein a first air flow intensity of the first air flow and a second air flow intensity of the second air flow can be set individually,
wherein the air outlet has a first deflecting wall downstream of the first duct end in a direction of flow,
wherein the first deflecting wall deflects the first air flow such that the first air flow intersects the second air flow,
wherein a suction device and a blow-out device are provided at the air outlet, wherein the suction device draws in at least one of the first air flow or the second air flow, and wherein the blow-out device creates a blow-out air flow that interacts with at least one of the first air flow or the second air flow,
wherein the air outlet further has a second deflecting wall downstream of the second duct end in the direction of flow to deflect the second air flow toward the first air flow, the second deflecting wall opposing the first deflecting wall such that an air outlet duct is provided between an inner surface of the first deflecting wall and an inner surface of the second deflecting wall, the inner surface of the first deflecting wall opposing the inner surface of the second deflecting wall,
wherein the first deflecting wall and the second deflecting wall are shaped so that the air outlet duct has a narrowest air outlet cross section provided between the inner surface of the first deflecting wall and the inner surface of the second deflecting wall,
wherein upstream of the narrowest air outlet cross section, the air outlet duct has a first air outlet cross section provided between the inner surface of the first deflecting wall and the inner surface of the second deflecting wall that is wider than the narrowest air outlet cross section,
wherein downstream of the narrowest air outlet cross section, the air outlet duct has a second air outlet cross section provided between the inner surface of the first deflecting wall and the inner surface of the second deflecting wall that is wider than the narrowest air outlet cross section,
wherein, in the direction of flow, the suction device is arranged downstream of the narrowest air outlet cross section of the air outlet, and wherein in the direction of flow, the blow-out device is arranged downstream of the narrowest air outlet cross section of the air outlet,
wherein the first deflecting wall has a first curvature, wherein the first curvature is directed away from the second air flow in the direction of flow,
wherein the second deflecting wall has a second curvature, and wherein the second curvature is directed away from the first air flow in the direction of flow, and
wherein the second curvature adjoins a rounding of the second deflecting wall pointing towards the first air flow, so that the second deflecting wall initially goes towards the first air flow and subsequently turns away therefrom.

2. The ventilation device according to claim 1, wherein the first ventilation duct has a first duct inlet and the second ventilation duct has a second duct inlet, wherein the first duct inlet and the second duct inlet are coupled in fluid communication to a common primary ventilation duct in such a manner that a primary air flow flowing through the primary ventilation duct in the direction of flow is directed into the first duct inlet and/or into the second duct inlet.

3. The ventilation device according to claim 2, wherein the ventilation device has an air flow control device, wherein the air flow control device is designed for targeted control of a division of the primary air flow flowing through the primary ventilation duct between the first ventilation duct and the second ventilation duct.

4. The ventilation device according to claim 3, wherein the air flow control device has a movable flap for dividing the primary air flow between the first ventilation duct and the second ventilation duct.

5. A motor vehicle having a passenger compartment and the ventilation device according to claim 1 for ventilating the passenger compartment, wherein the air outlet of the ventilation device opens into the passenger compartment.

6. The ventilation device according to claim 1, wherein an outlet of the blow-out device and an inlet of the suction device are located in the air outlet.

* * * * *